Jan. 16, 1951     A. B. ROGERS ET AL     2,538,427
AIRCRAFT PILOT'S SEAT

Filed Aug. 29, 1944     3 Sheets-Sheet 1

INVENTORS
Allan B. Rogers & Charles G. Brown
BY
Their Patent Attorney

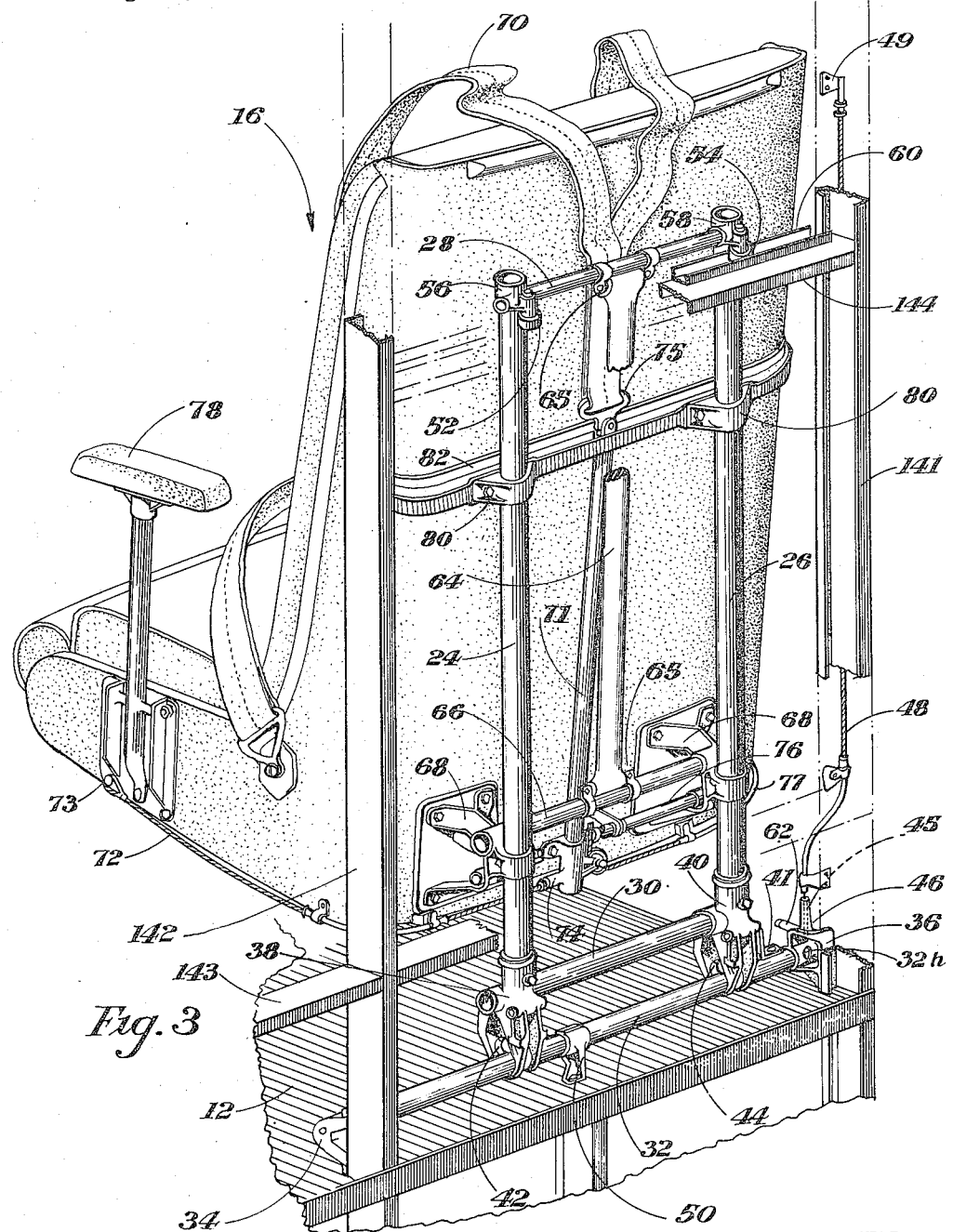

Jan. 16, 1951     A. B. ROGERS ET AL     2,538,427
AIRCRAFT PILOT'S SEAT

Filed Aug. 29, 1944     3 Sheets-Sheet 3

INVENTORS
Allan B. Rogers & Charles G. Brown
BY
Their Patent Attorney

Patented Jan. 16, 1951

2,538,427

UNITED STATES PATENT OFFICE 2,538,427

AIRCRAFT PILOT'S SEAT

Allan B. Rogers and Charles G. Brown, Santa Monica, Calif., assignors to Douglas Aircraft Company, Inc., a corporation of California Application August 29, 1944, Serial No. 551,652

14 Claims. (Cl. 244—122)

The present invention relates to seats and more particularly to improvements in adjustable and readily removable aircraft pilots' seats.

It is already known to provide a seat for a pilot or other occupant which is adjustable vertically and which is also resiliently supported at any of its vertically adjusted positions. The present invention relates to improvements in this general type seat and more particularly to a mounting arrangement whereby such seats are permitted to be moved laterally to facilitate the pilot's entry and egress, as well as to permit the ready removability of the seat. Many of the prior seats and seat arrangements which have been either proposed or used have proven objectionable in that their operation was burdensome and otherwise unsatisfactory to the pilot, they were encumbered by numerous levers and other mechanism for actuating the seat adjustment means and latches, and were not otherwise foolproof in presenting projecting parts which might be accidentally caught by the pilot's clothing or equipment. The present invention has overcome these and other objections to the prior art devices and provides a novel seat mounting arrangement by means of which the seat is adjusted or moved laterally, as well as vertically, to permit ready entry and egress of the occupant and is further arranged that it is readily removable from its supporting structure.

A problem confronting aircraft designers has been the provision of a pilot position having relatively great visibility in the nose portions of aircraft fuselages of generally circular cross-section to withstand internal pressurization. This problem has been successfully overcome by the provision of openings in the fuselage wall above the pilot's seat and the provision of outwardly bulged transparent enclosures, commonly referred to as "bug-eyes" or blisters, disposed above each opening. The present invention is particularly adapted for use with pilot enclosures of the type described in co-pending application Serial No. 459,212, which issued on September 25, 1945, as Patent No. 2,385,684 for a Pilot Enclosure, to Edward F. Burton and Allan B. Rogers, the latter being one of the applicants in the present application.

It is accordingly a primary object of the present invention to provide a seat mounting arrangement by means of which a vertically adjustable resiliently supported seat may be mounted upon a supporting structure to permit of its being laterally movable to readily permit entry and egress of the occupant. It is a further object to provide an arrangement of pilot's and co-pilot's seats within an airplane pilots' compartment which more comfortably facilitates the entry and egress of the pilots into and out of their operative positions.

It is also an object of the present invention to provide a seat arrangement such that the pilot may readily slide the seat sideways when getting into or out of the seat yet lock it securely in its operative position without the necessity of having any projecting levers or the like to be operated and which might be accidentally caught by the pilot's clothing or equipment. A further object of the present invention resides in the provision of a novel seat suspension in which the seat structure may be readily removed by releasing the connection to the seat positioning structure but in which the seat remains suspended until lifted off the supporting structure thereby avoiding the possibility of accidental damage to equipment in the pilot's compartment.

Other objects and advantages of the present invention will become apparent to those skilled in the art after a reading of the present description together with the accompanying drawings forming a part hereof, in which:

Fig. 3 is a perspective view showing one of the seats and its supporting structure;

Figure 1:
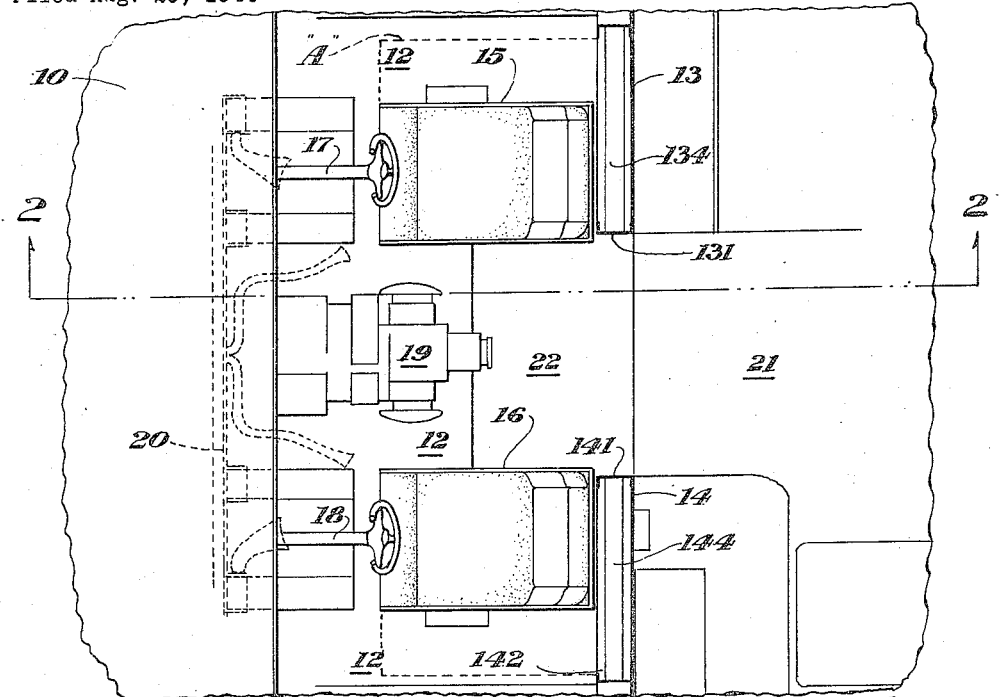
Fig. 1 is a top plan view of the pilot's compartment of an airplane equipped with the seat and seating arrangement of the present invention.
Figure 2:
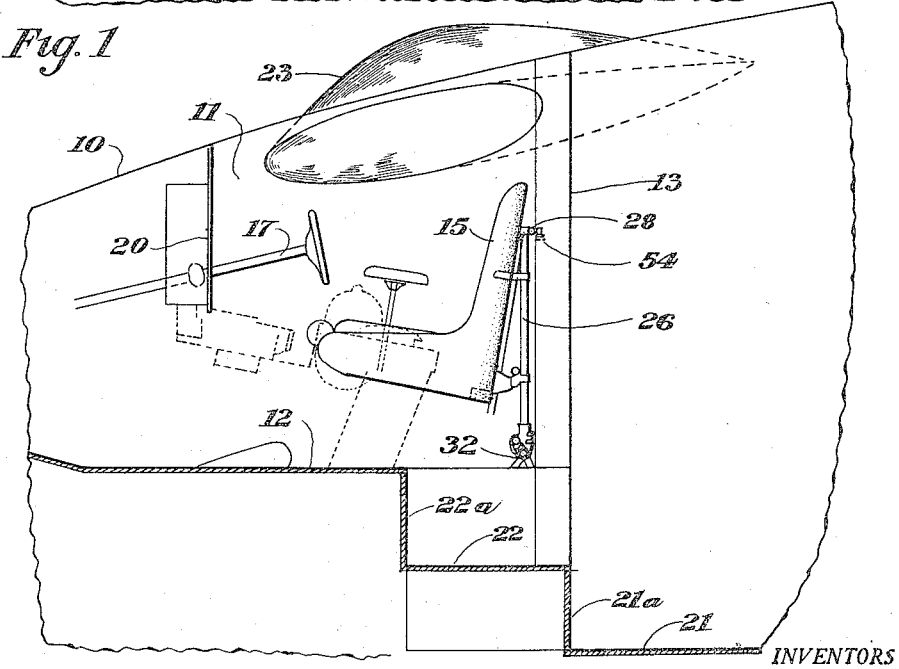
Fig. 2 is a side elevational view of the same.

Referring now to Figs. 1 and 2, the numeral 10 represents the fuselage of a relatively large airplane having a pilot's compartment 11 the floor of which is indicated as 12 and is defined at its rearward limits by the transverse bulkhead walls 13 and 14. The pilot's compartment is provided with a starboard or right side seat 15 for the co-pilot and a port seat 16 for the pilot, each disposed aft of and facing forwardly toward the respective flight control columns 17 and 18. The numeral 19 indicates a control pedestal of a size frequently found necessary in large aircraft of the type shown, and forwardly thereof, and of the control columns, there is provided the conventional instrument or control panel 20 on which the instruments and further controls are mounted.

The main upper floor or deck of the aircraft aft of the bulkhead 13—14 is indicated at 21 at an elevation appreciably lower than that of the compartment floor 12; and centrally disposed within the airplane in a lateral sense and extending into the pilot's compartment at an intermediate elevation is the step or landing 22. This step 22 extends laterally between the opposed end channel uprights 131 and 141 of the bulkheads 13 and 14, aft to the riser 21a at the bulkhead line, and terminates forwardly at the riser 22a. Immediately above the pilot's and co-pilot's seats 16 and 15, there are provided openings through the streamlined skin of the fuselage, and each of these openings is faired and protected by an individual transparent bubble or "bug-eye." Each of these streamlined "bug-eyes" or blisters is preferably made of a single piece of transparent glass or plastic, being of a rounded form forwardly and tapering substantially to a point at its aft extremity. The pilot's compartment is accordingly devoid of a windshield or cockpit canopy of the conventional type, but is provided with two individual bubble fairings adapted to shield and protect the pilot's head, which in his operating position, extends outwardly beyond the projected line of the exterior surface of the fuselage skin.

Referring now to Fig. 3, there is shown a more or less conventional seat 16, which is the pilot's seat of Fig. 1, and which is supplied with all the usual fittings cooperating with the pilot's standard and combat equipment. This seat is also provided with conventional equipment for its adjustment for height and its resilient support at the adjusted height, and which features will be hereinafter more fully referred to. To the vertical bulkhead channels 141 and 142, there is fixedly attached the horizontal channels or interstices 143 and 144. A rigid chair supporting frame is formed by the vertical tubes 24 and 26 connected adjacent their upper terminals to the upper cross tube 28 and adjacent their lower terminals to the lower cross tube 30. A main weight supporting and securing tube 32 is releasably supported within the bracket fittings 34 and 36 which in turn are attached to the upright channels 142 and 141 respectively just above the pilot compartment floor 12. The fittings or castings 38 and 40 serve to connect the vertical tubes 24 and 26 with the lower cross tube 30 and also to transmit the weight of the chair 16 and its occupant to the main supporting tube 32 by means of the flanged rollers 42 and 44 pivotally mounted in each of these fittings. The frame tubes 24, 26, 28 and 30 together with their interconnecting fittings and the rollers 42 and 44 serve to form a laterally movable supporting carriage for the chair 16, substantially all of the weight being carried upon the removable transverse tube 32.

Figure 4:
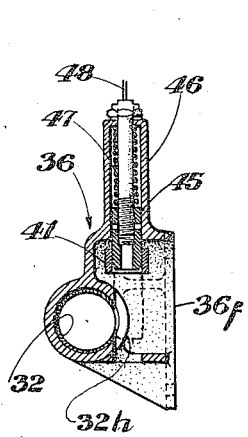
Fig. 4 is a cross sectional view of one of the main supporting tube brackets as taken up along the line 4—4 of Fig. 5.
Figure 5:
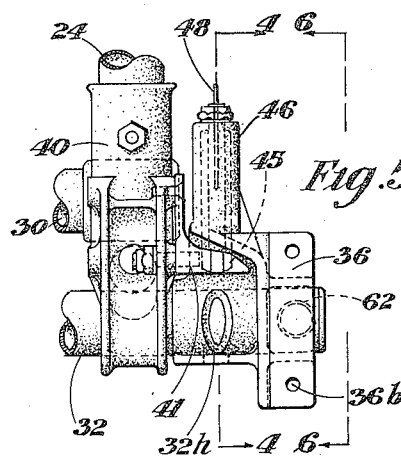
Fig. 5 is a rear elevational view of the bracket of Fig. 4 together with the adjacent latching carriage fitting.
Figure 6:
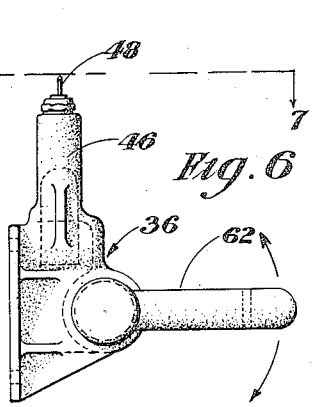
Fig. 6 is an end elevational view of the main supporting bracket shown in Figs. 4 and 5.

In the construction illustrated in Fig. 3 the right hand fitting 40 abuts and is detachably locked to the right hand bracket 36 mounted upon the channel 141 in the operative or occupied position of the chair 16, this detachable locking being effected by a spring-pressed pin 45 housed in the projection 46 on the bracket 36 and engaging with the opening 41 provided in the fitting 40. As shown in this and the detailed Figures 4 and 5, the pin 45 housed within the projection 46 is continually urged downwardly into its latching position as indicated by the dotted lines in Fig. 4. Thus it not only extends through the opening in the tongue 41 of the fitting 40, but also into the notch 32h cut through the wall of the removable tube 32 to thereby prevent its rotation by the handle 62 attached to its free end, beyond the bracket 36. The pin 45 is released by pulling on the cable 48 which is anchored at its upper terminal 49 to the bulkhead structure. By pulling on the cable 48 the chair may be free to permit it to slide laterally to the left along the supporting tube 32 as permitted by the length of this tube until the left hand roller fitting 38 is stopped by coming against the left hand bracket 34. An intermediate bracket 50 for the tube 32 may be provided to support the tube from the compartment floor 12 at a point between the brackets 34 and 36 at which it will not interfere with the lateral sliding of the roller fittings 38 and 40.

Figure 10:
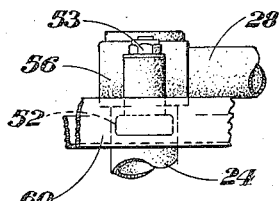
Fig. 10 is a rear elevational view of one of the upper roller attachment fittings.
Figure 11:
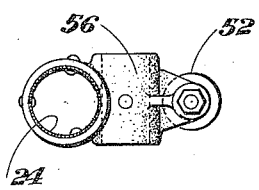
Fig. 11 is a plan view of the same.
Figure 12:
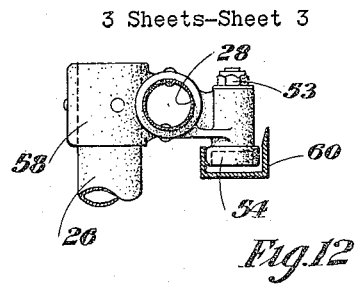
Fig. 12 is a side elevational view of the other roller attachment fitting.
Figures 8, 9:
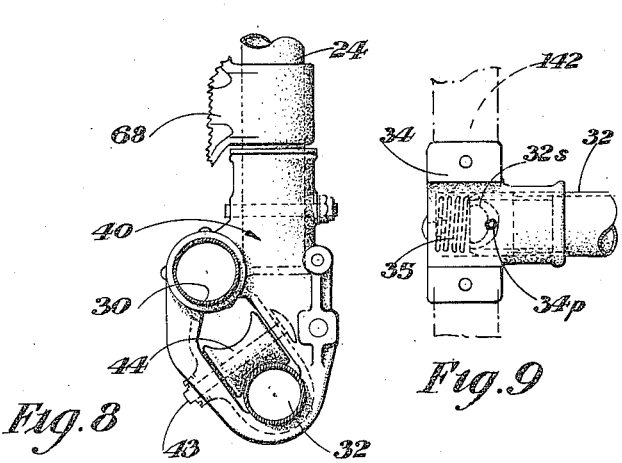
Fig. 8 is a side elevational view of the same carriage fitting shown in Figs. 5 and 7.
Fig. 9 is a rear elevational view of the complementary supporting bracket and its releasable tube attachment.
Figure 7:
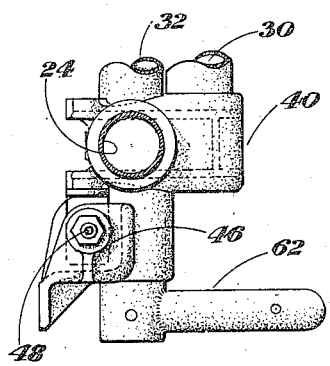
Fig. 7 is a top plan view of the bracket shown in Fig. 6 as indicated by the line 7—7 and also includes the adjacent carriage fitting.

The tubular interconnecting fittings 56 and 58 at the top of the supporting frame have mounted in each for vertical pivotation the rollers 52 and 54 which are guided laterally by the upwardly facing channel 60 forming a guideway or track. As may be more clearly seen in Figs. 10, 11 and 12, these upper fittings are provided with socket portions to receive the tubes 24, 26 and 28 and have axles or pivots 53 on which the rollers 52 and 54 are adapted to rotate. These rollers 52 and 54 extend down into and rotate along the channel track 60 to prevent the frame from rotating forwardly about the rollers 42 and 44 engaging tube or rail 32, whereas substantially all of the weight of the seat and its occupants is carried upon the supporting tube 32. The latter tube 32 is arranged to be readily removable from the brackets 34 and 36 as by upward pull on the cable 48 releasing the pin 45 from its engagement with the tubular notch 32h, being further accomplished by rotation of the handle 62 fixedly attached to the end of the tube 32 nearest the well or step 22. The opposite end of the supporting tube 32 is provided with a bayonet joint comprising a pair of spirally arranged slots 32s open to the end of the tube adapted to engage the cross pin 34p fixedly supported in the bracket fitting 34. A compression spring 35 is attached to the bracket 34 in a position in which it is engaged and compressed by the tube 32, and as the tube is rotated and the pin 34p brought to its end the spring serves to push the tube toward its released position in which it can be pulled laterally until it is entirely removed from the fittings 34, 50 and 36. It will be noted that the upper end of the chair supporting frame is guided only in its operative position by the rollers 52 and 54 engaging the track 60 to prevent rotation of the seat on the tube 32 but when this supporting tube 32 is removed he supporting frame is suspended and entirely supported by the rollers 52 and 54.

The seat 16 is further provided with a rubber suspension member 64 for resiliently suspending the seat from the upper cross tube 28 to which it is attached by the shackle 65 and in turn connected by means of a similar shackle 65 at the lower cross tube 66. The latter tubular securing member is mounted in the brackets 68 fixed to the chair back, these brackets having tubular guides adapted to embrace and slide along the vertical guide tubes 24 and 26 of the supporting frame-work. The seat is also provided with a shoulder harness 70 connected to a pair of telescopic adjustment tubes 71, a spring (not shown) being arranged between the inner and the outer tubes tending to keep the tubes nested within one another, but which may be released by the pilot pulling upon the cord 72 shown anchored to the side of the seat at the fitting 73 beneath the armrest 78. While the catch 74 is released in this manner by the pilot he can pull the inner tube up by bending his body forward or enable the inner tube to move further into the outer tube by bending his body backwardly, the release of the cord 72 serving to again lock the inner and outer tubes 71 together by the latch 74. The numeral 76 represents a cross tube mounted for rotational movement in the brackets 68 referred to above and is operated through a lever and cord 77 extending along the opposite or right hand edge of the seat to that just referred to. The latter cord 77 is used by the pilot for releasing the latch thereby permitting the chair to be adjusted in height on the guide columns 24 and 26; and release of the cord causes the latches to hold the chair in its adjusted vertical position. The resilient telescopic suspension tube 71, referred to above connected to the harness 70 by means of the attachment buckle 75, is disposed within a guide slot in the frame 82, which is also provided with the guide brackets 80 which embrace and slide along the guide columns 24 and 26 adjacent their upper terminals when the seat is adjusted vertically.

By means of the disclosed seat suspension and seat arrangement, it is possible for the occupants to conveniently and quickly enter or leave their flight or operating positions. It should be noted that there is not sufficient head or foot room for either the pilot or co-pilot to stand up upon either the access step 22 or the compartment floor 12 in a position in which he could readily be seated upon either of the seats in their full line positions in Fig. 1. In order to enter the seat 15, the co-pilot first causes the seat to be released for lateral movement and moves the same outwardly into the dotted line position at "A." With the seat in this outwardly displaced position it is now possible for the pilot to stand up upon the access step 22 and onto the compartment floor 12 and with his head projecting into the "bug-eye" or blister through the opening in the fuselage skin surface. Then after seating himself upon the displaced seat he causes the same to be moved laterally and inwardly to its extreme inner position in which the fittings 36 and 40 come into contact with each other and the spring-pressed pin 45 engages the orificed tongue 41 and at the same time locks the tube 32 from rotation or removal by engaging the notch 32h. As the chair is thus moved laterally and inwardly the co-pilot's head will naturally be raised slightly until it occupies the centralized or optimum position within the "bug-eye," or should it be found that the pilot's eyes are either too high or too low the chair is adjusted accordingly by the height adjusting and locking elements referred to above.

The entire seating installation is arranged such that the pilot's and co-pilot's heads are definitely positioned within the transparent plastic blisters. It should also be noted that there is not sufficient head room for the pilot or co-pilot to stand up until the chairs are displaced laterally to enable the occupants to step down to the floor of the access space 22. The seats are arranged such that when they are in their inwardly disposed positions shown in the full lines in Fig. 1, they are centrally located with respect to the axes of the blisters or "bug-eyes" and the seats have no fore and aft adjustment inasmuch as the pilots' have to be positioned substantially at a definite position within the blister. In a similar manner the seats may be left by either occupant by moving the seat outwardly into its dotted line position with the occupant keeping his head substantially along the fore and aft center line of the blister, although his head will of course be lowered slightly due to the inclined attitude of the upper part of his body. In this outwardly moved position of the seat the occupant can readily step out and down upon either or both the compartment floor 12 and the access space or step 22.

It will be noted that among the advantages of this arrangement of the seats is the fact that the pilot may readily slide the seat sideways in getting into or out of the seat and to lock it securely in its operative position without having any levers or the like to operate which might be accidentally caught by the pilot's clothing or equipment. It should further be noted that the entire seat may also be readily removed by releasing the connections to the seat positioning structure, but that it remains suspended until lifted down, thus avoiding the possibility of accidental damage to any of the equipment within the pilot's compartment.

Other forms and modifications of the present invention both in respect to its general arrangement and the details of its respective parts are all intended to fall within the scope and spirit of this invention as more particularly set forth in the appended claims.

We claim:

1. In a readily removable adjustable seat installation, a seat having a back, a supporting structure, readily detachable seat supporting means comprising upper and lower pairs of rotatable elements, horizontal guide means carried by said supporting structure engageable by said upper pair of said rotatable elements adjacent the top of said seat back, removable guide means releasably attached to said supporting structure engageable by said lower pair of rotatable elements, said lower pair of rotatable elements adapted to normally carry the weight of said seat and its occupant, said seat supporting means including apertured lower fittings within which said lower rotatable elements are journaled, the apertured portions of said lower fittings adapted to slidingly embrace said removable lower guide means, said upper pair of rotatable elements normally preventing rotation of said seat about said lower pair of rotatable elements, whereby removal of said lower guide means and disengagement of said lower pair of rotatable elements and lower fittings, therefrom causes suspension of said seat from said upper pair of rotatable elements from which said seat may be readily lifted for removal from said supporting structure.

2. In a readily removable aircraft seat installation, track engaging means associated with an upper portion of the back of said seat, a relatively fixed track having an upwardly facing recess engageable by said upper engaging means, apertured track engaging means associated with a lower portion of said seat back, a removable track member embracingly engageable by the apertures of said lower track engaging means, said track-engaging means including a pair of vertical rail members, apertured means carried by said seat back for vertical sliding adjustment with respect to said rail members, said lower track normally sustaining substantially the entire weight of said seat and said upper track normally serving only to maintain said seat in its upright position, whereby removal of said lower track member transfers the weight of said seat to said upper track engaging means from which said seat and its associated rail members and track-engaging means may be readily lifted for removal from its suspended position within said fixed track recess.

3. In an aircraft pilot's compartment within a fuselage, a pair of laterally disposed adjustable pilot's seats, a pair of laterally disposed control columns longitudinally aligned with the operating positions of said seats, a pair of outwardly bulged transparent blisters vertically and longitudinally aligned with the operative positions of said seats, said transparent blisters having optimum positions for the eyes of said pilot, horizontal guide tracks carried upon the aircraft, suspension means slidably mounted upon said guide tracks whereby said seats may be laterally moved outwardly from their operative positions to permit entry and egress of the occupant, and means carried upon said seat slidingly mounted upon said suspension means for the vertical adjustment of said pilot position into the optimum eye position of said transparent blisters.

4. In an aircraft pilot position, an exterior wall portion of an aircraft having an observation opening therein adapted for the partial protrusion of the pilot's body therethrough, a pilot seat normally supported beneath said observation opening, means for laterally moving said seat whereby the pilot may place his body in a leaning position beneath said opening with his body partially protruding therethrough and draw the seat laterally beneath him, and means for vertically adjusting said seat for his support in the normal flying position.

5. In an aircraft pilot compartment an aircraft skin having an opening therein adapted to accommodate the upper portion of a pilot's body for observation therethrough, a control instrumentality disposed in substantially the same vertical longitudinally extending plane passing thorugh the central portion of said skin opening, a streamlined transparent blister disposed around and outside the said skin opening for the protection of the upper portion of the pilot's body, a laterally movable pilot's seat adapted to facilitate the entry of a pilot into an operative position with respect to said seat, control instrumentality and observation opening and means for vertically adjusting said seat to the optimum eye position of said pilot with respect to said observation opening.

6. In an aircraft pilot position, a fuselage wall having an opening through an upper portion thereof, an outwardly bulged enclosure over said opening, a pilot seat normally supported from the aircraft structure beneath said opening and enclosure, means for slidably mounting said seat in a lateral direction upon said supporting structure to facilitate the entry of the pilot into said seat and movement of said pilot and seat into an operative position with respect to said opening and enclosure, means for adjustably mounting said seat in a vertical direction upon the aircraft structure to facilitate positioning the pilot's eyes in an optimum position within said opening and enclosure, and means associated with the said lateral adjustment means for releasing said seat from said supporting aircraft structure.

7. In an aircraft seat arrangement, a fuselage having a pilot compartment in a forward portion thereof, openings in the fuselage wall above said compartment to each side of and laterally spaced from the longitudinal vertical plane of symmetry of said fuselage, an outwardly bulged enclosure over each opening, a pilot seat normally disposed beneath each said opening, and suspension means for said seats arranged for their lateral and vertical adjustment to permit entry by the pilot and movement to properly elevated positions with respect to said openings and enclosures.

8. A mounting for an adjustable aircraft seat comprising a fixed supporting structure carrying upper and lower horizontal rails disposed in a substantially vertical relationship to each other, the upper said rail having an upwardly facing recess and the lower said rail being removable from said fixed supporting structure, a suspension framework including a pair of vertical rail elements, means associated with said framework for the rolling engagement of said framework with said horizontal rails, said rolling means including apertured lower portions normally engaged by said lower rail, guide means associated with said seat back for sliding vertical engagement with the vertical rails of said suspension framework, said seat adapted to be adjusted vertically along the vertical rails of said framework, to be adjusted laterally along said horizontal rails, and to be readily removed from said fixed supporting structure by removal of said lower horizontal rail and the release of said suspension framework from said supporting structure by the lifting of said upper rolling means from the recess of said upper rail.

9. In a seat mounting arrangement for an aircraft observation position, a wall portion of an aircraft having an observation opening arranged for the accommodation of an occupant's head therein, a seat, a pair of spaced laterally extending support rails carried by the aircraft, a movable support member having rail engaging elements arranged for lateral movement of said member upon said support rails, said support member including vertical rail means, and means carried by said seat for engagement with said vertical rail means of said support member, the seat mounting being arranged in such manner that said seat is laterally adjustable along said laterally extending support rails to facilitate access by the occupant into the seat and with respect to said observation opening and said seat is vertically adjustable along said vertical rail means of said movable support member for the optimum head position of said occupant with respect to said observation opening.

10. In an aircraft observation position, a wall portion of the aircraft having an observation opening arranged for the accommodation of an occupant's head therein, an adjustable seat supported from the aircraft structure beneath said observation opening, a pair of vertically spaced horizontal guides supported upon the aircraft structure adjacent said seat, a suspension framework having portions arranged for engagement with said horizontal supporting guides arranged for the lateral adjustment of said suspension framework along said horizontal supporting guides, a lower of said horizontal guides being removable from the aircraft structure and from engagement by the engaging portions of said suspension framework, said seat having means engaging said suspension framework for vertical adjustment with respect thereto whereby the occupant's accessibility into said seat and into said observation position is facilitated and the removability of said seat improved by its suspension from said upper horizontal supporting guide upon being freed from engagement by said lower guide.

11. In an aircraft seat arrangement, a fuselage having an observation position therein, an opening in the fuselage structure above said observation position, an outwardly bulged transparent enclosure over said fuselage opening, a seat normally disposed beneath said fuselage opening, suspension means for said seat arranged for lateral movement thereof to permit entry by an occupant and vertical movement to properly elevated positions with respect to said opening and enclosure, and means associated with the suspension means for said lateral movement for releasing said seat and said suspension means from said supporting fuselage structure.

12. A mounting for an adjustable seat comprising a seat, a fixed supporting structure carrying upper and lower horizontal guide means vertically spaced with respect to each other, releasing means associated with the lower of the said horizontal guide means to facilitate its being readily removable from said fixed supporting structure, a suspension member having means associated therewith for lateral supporting movement of said member upon said horizontal guide means, vertical guide means associated with said suspension member and said seat for sliding vertical engagement of said seat with said vertical guide means of said suspension member, said seat arranged for vertical and lateral adjustment and for suspension from said upper horizontal guide means for removal of said lower removable horizontal guide means during the removal of said seat by which said seat may be lifted from said upper guide means without damage to other equipment within the aircraft.

13. In an aircraft seat arrangement, a fuselage having a compartment in a forward portion thereof, openings in the fuselage wall above said compartment each laterally disposed with respect to the other opening, transparent enclosures associated with each said opening, a seat normally disposed beneath each said opening, a floor within said compartment having a lowered floor portion centrally disposed between said seats, and suspension means for said seats arranged for their lateral and vertical adjustments to permit entry by an occupant by stepping from said lowered floor portion to said man floor portion for access to and lateral adjustment of said seats to positions beneath said openings and by vertical adjustments of said seats to properly elevated positions with respect to said openings.

14. In a seat mounting, a seat having rail engaging means on the back thereof, a pair of horizontal rails mounted upon a supporting structure, a lower of said horizontal rails being readily removable from said structure, a seat suspension member having vertical means engageable with said horizontal rails for lateral adjustment therealong, said seat suspension means arranged to be suspended from the upper of said horizontal rails upon removal of said lower readily removable horizontal rail, means for latching said seat suspension means with respect to said horizontal rails, said rail engaging means associated with said seat arranged to engage said vertical rail means of said seat suspension means for vertical adjustment therealong, means to latch said seat with respect to said vertical suspension means, said mounting arranged to provide lateral and vertical adjustments of said seats with respect to the supporting structure and suspension and ready removability therefrom upon removal of said lower horizontal rail.

ALLAN B. ROGERS.
CHARLES G. BROWN.

REFERENCES CITED

The following references are of record in the file of this patent:

UNITED STATES PATENTS

| Number | Name | Date |
|---|---|---|
| 1,050,980 | Mott | Jan. 21, 1913 |
| 1,087,540 | Kennedy | Feb. 17, 1914 |
| 2,292,414 | Vernon | Aug. 11, 1942 |
| 2,367,829 | Shinn | Jan. 23, 1945 |
| 2,385,684 | Burton et al. | Sept. 25, 1945 |

FOREIGN PATENTS

| Number | Country | Date |
|---|---|---|
| 173,345 | Switzerland | Feb. 16, 1935 |